United States Patent
Takishita

[19]

[11] Patent Number: 6,121,900
[45] Date of Patent: Sep. 19, 2000

[54] METHOD OF DISPLAYING MAPS FOR A CAR NAVIGATION UNIT

[75] Inventor: Hideyuki Takishita, Tokyo, Japan

[73] Assignee: Alpine Electronics, Inc., Tokyo, Japan

[21] Appl. No.: 09/132,007

[22] Filed: Aug. 10, 1998

[30] Foreign Application Priority Data

Aug. 11, 1997 [JP] Japan .................................. 9-216278

[51] Int. Cl.⁷ .................................................. G08G 1/123
[52] U.S. Cl. ......................... 340/995; 340/990; 701/208; 701/212
[58] Field of Search ................................... 340/995, 990, 340/988; 701/208, 211, 212

[56] References Cited

U.S. PATENT DOCUMENTS

| | | | |
|---|---|---|---|
| 4,675,676 | 6/1987 | Takanabe et al. | 340/995 |
| 5,398,188 | 3/1995 | Maruyama | 340/995 |
| 5,731,979 | 3/1998 | Yano et al. | 340/995 |
| 5,884,217 | 3/1999 | Koyanagi | 340/995 |
| 5,908,464 | 6/1999 | Kishigami et al. | 340/995 |

*Primary Examiner*—Brent A. Swarthout
*Attorney, Agent, or Firm*—Brinks Hofer Gilson & Lione

[57] ABSTRACT

The invention provides a method of displaying maps for a vehicle navigation unit that displays a wide area map and an expanded map simultaneously on the display screen, and scrolls the detailed map on a cursor screen synchronously with a cursor movement on the wide area map, thereby facilitating the driver's comprehension of the vehicle's position on the map. The method to achieve the foregoing object comprises: dividing a display screen into a main screen and a cursor screen; when the two-screen map display is requested, displaying a wide area map on the main screen and at the same time displaying on the main screen a cursor indicating a specific area on the wide area map; displaying a detailed map on the cursor screen of an area indicated by the cursor; moving the cursor on the wide area map on the main screen in accordance with the travel of the vehicle, and scrolling the detailed map on the cursor screen in accordance with the movement of the cursor; and, when the cursor reaches a specific position on the main screen, displaying a wide area map adjoining the foregoing wide area map on the main screen and displaying the cursor at a setting position on the main screen.

19 Claims, 7 Drawing Sheets

CHART TO EXPLAIN THE METHOD OF DISPLAYING
MAPS OF THE INVENTION
(TWO SCREEN MAP DISPLAY)

CHART TO EXPLAIN THE METHOD OF DISPLAYING
MAPS OF THE INVENTION
(WIDE AREA MAP)

CHART TO EXPLAIN THE METHOD OF DISPLAYING MAPS OF THE INVENTION
(MOVEMENT OF CURSOR / SCROLLING OF DETAILED MAP)

CHART TO EXPLAIN EXPANSION / REDUCTION OF MAPS IN TWO SCREEN MAP DISPLAY MODE

BLOCK DIAGRAM OF THE NAVIGATION UNIT OF THE INVENTION

FIG. 6

APPEARANCE OF THE REMOTE CONTROL UNIT

METHOD OF DISPLAYING MAPS FOR A CAR NAVIGATION UNIT

BACKGROUND OF THE INVENTION

1. Field of the Invention

The present invention relates to a method of displaying maps for a car navigation unit, and particularly a method in which the entire display screen can be employed for displaying one map (one-screen map display), or the display screen can be divided into two parts for simultaneously displaying both a wide area map and a detailed map on each of the divided screens (two-screen map display).

2. Description of the Related Art

In the conventional car navigation unit, to give a driver of a vehicle route guide information whereby the driver can easily arrive at a desired destination, the following operations are performed: detecting the position of the vehicle, reading out map data surrounding the vehicle position from the CD-ROM, displaying a map image on the display screen, superposing the vehicle position mark at a specific position on the map image; and moving the vehicle position mark on the display as the vehicle moves to change the present position, or scrolling the map image while fixing the vehicle position mark at a specific position on the center of the display screen. As a result, the driver can get ostensibly understandable map information surrounding the vehicle position.

However, the conventional car navigation unit is designed to present only one map on the display screen. Therefore, when presenting a detailed map (expanded map) on the display screen, the driver may not find where the position indicated by the vehicle position mark is. And, when presenting a wide area map (reduced map), the driver cannot find the precise position of the vehicle. Accordingly, the driver usually displays the wide area map and the detailed map alternately on the screen to thereby recognize the vehicle position. However, this method requires frequent switching operations between the wide area map and the detailed map, which imposes a danger to safe driving as well as gives poor operability to the driver.

The present invention has been made in view of the foregoing problems, and an object of the present invention is to provide a method of displaying a wide area map and a detailed map simultaneously on the display screen, and scrolling the detailed map on a cursor screen synchronously with a cursor movement on the wide area map, whereby the driver can easily comprehend the vehicle position on the map.

SUMMARY OF THE INVENTION

In order to accomplish the foregoing object, the method of displaying maps for a car navigation unit according to the invention comprises: dividing a display screen into a main screen and a cursor screen; when the two-screen map display is requested, displaying a wide area map on the main screen and at the same time displaying a cursor indicating a specific area on the wide area map on the main screen; displaying a detailed map of the area indicated by the cursor on the cursor screen; moving the cursor on the wide area map on the main screen in accordance with the travel of a vehicle, and scrolling the detailed map on the cursor screen in accordance with the movement of the cursor; and when the cursor reaches a specific position on the main screen, changing the wide area map displayed on the main screen into a display in which the cursor is moved to a setting position on the main screen.

Figures 1A, 1B, 1C:
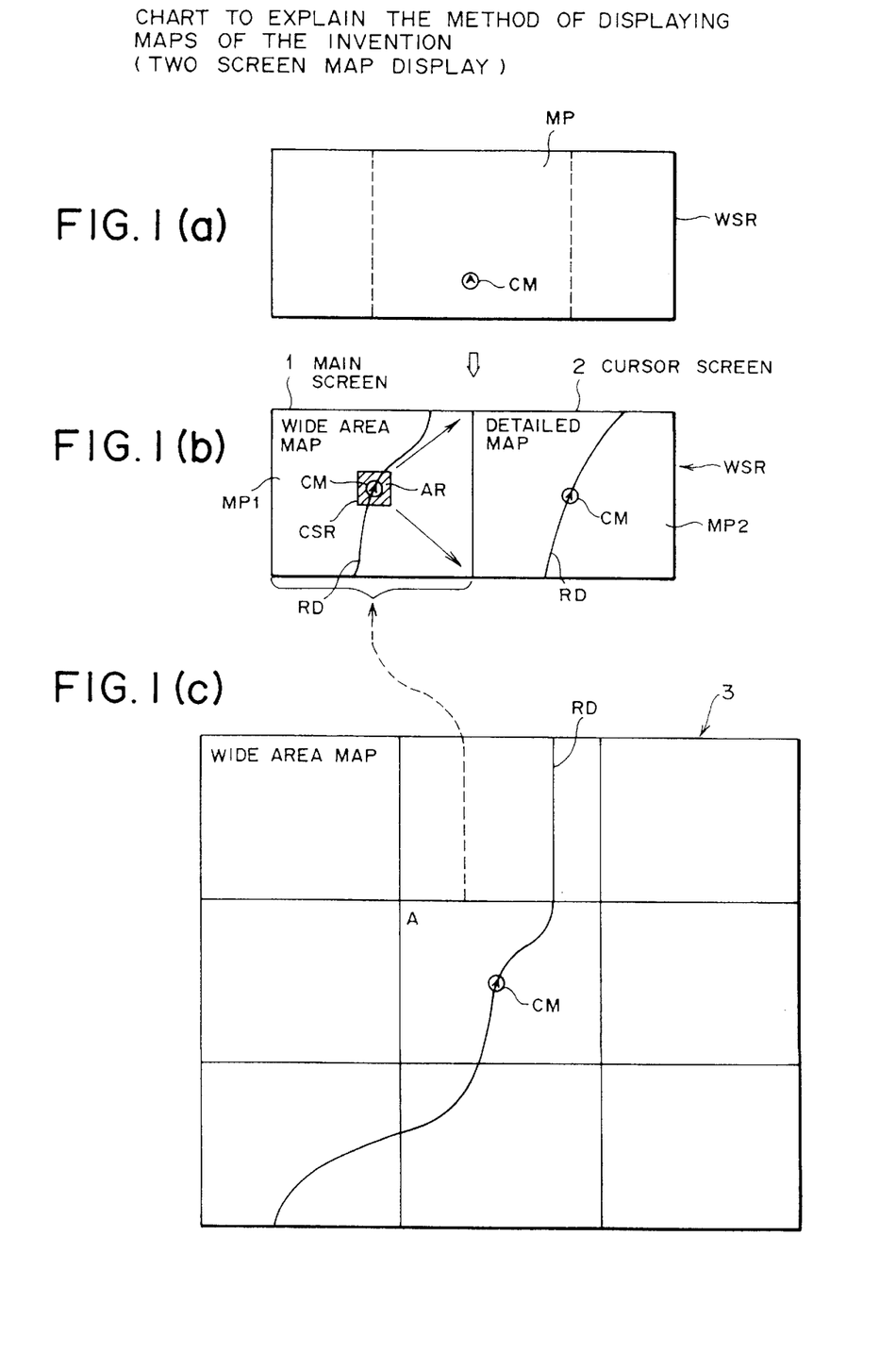
FIG. 1 is a chart (two-screen map display) to explain the method of displaying maps according to the present invention.
Figure 2:
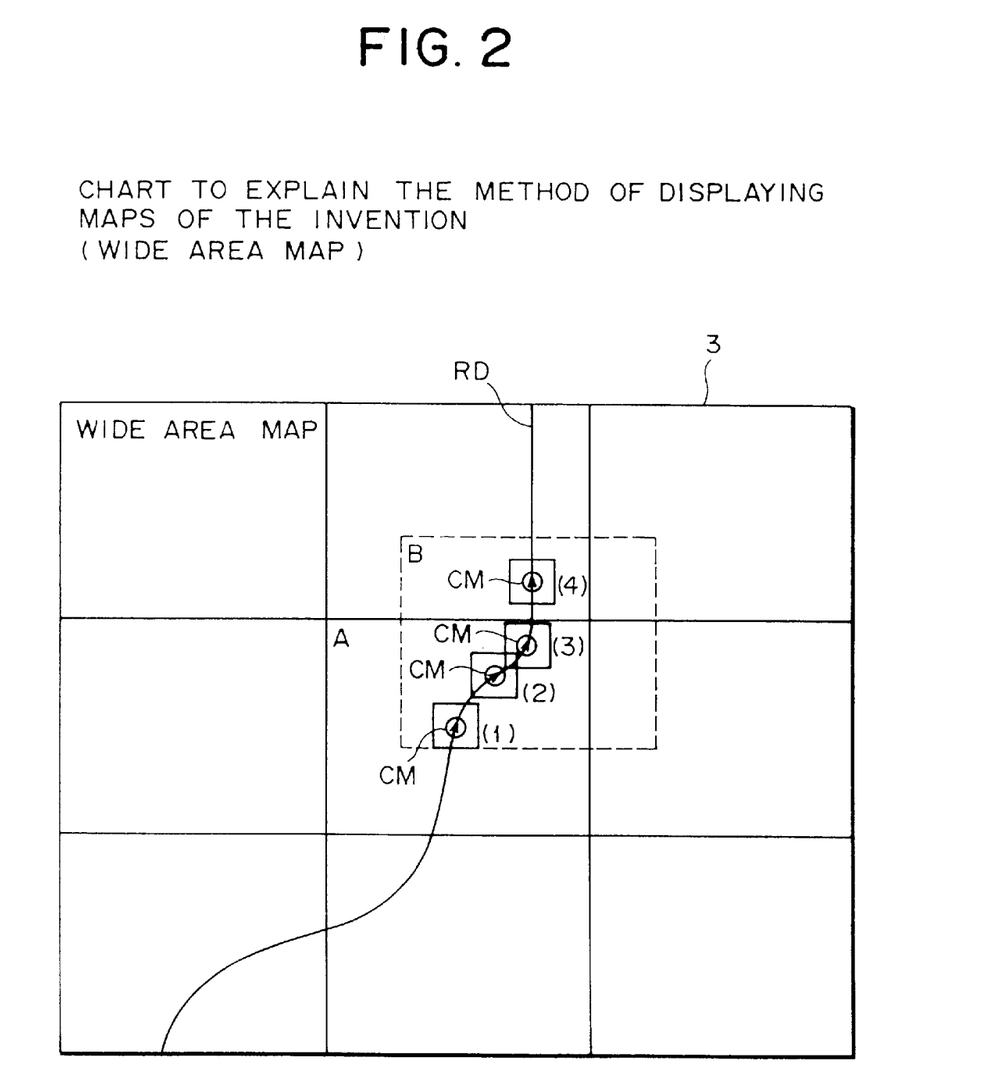
FIG. 2 is a chart (wide area map) to explain the method of displaying maps according to the present invention.
Figure 3:
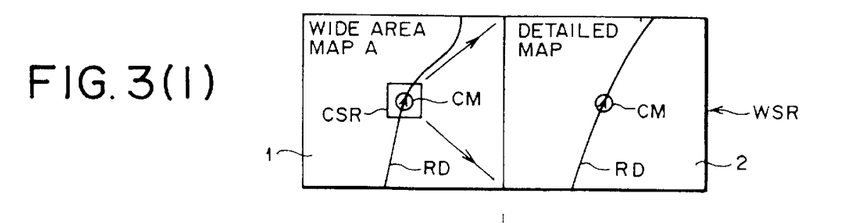
FIG. 3 is a chart (cursor movement display/scrolling of detailed map display) to explain the method of displaying maps according to the present invention.

DESCRIPTION OF THE PREFERRED EMBODIMENT (a) Method of Displaying Maps According to the Invention (a-1) Two-Screen Map Display and Scrolling FIG. 1–FIG. 3 are charts explaining the method of displaying maps according to the invention, including a landscape display screen WSR (long from side to side), the vehicle position mark CM, the cursor CSR, the map MP surrounding the vehicle position, the main screen 1 in the two-screen map display that presents the wide area map MP1, the cursor CSR indicating a specific area AR on the wide area map, the cursor screen 2 in the two-screen map display mode that presents an expanded display of the detailed map MP2 of the area AR indicated by the cursor CSR and the vehicle position mark CM on the center of the screen. The wide area map 3 contains nine screens, and the center wide area map A is assumed to be displayed on the main screen 1 in the two-screen map display. RD illustrates a road, In the one-screen map display mode in which the map MP is displayed on the display screen WSR in correspondence with the vehicle position (FIG. 1(a)), the remote control unit can request the two-screen map display. Then, as shown in FIG. 1(b), the main screen 1 presents: (1) the wide area map MP1 in a specific scale such that the vehicle position is at the center of the main screen 1, (2) the vehicle position mark CM, and (3) the rectangular cursor CSR indicating the area AR surrounding the vehicle. The cursor screen 2 presents the detailed map MP2 of the area AR surrounding the vehicle, indicated by the cursor CSR, and the vehicle position mark CM (thus, the two-screen map display is presented).

In the two-screen map display mode thus constructed, as the vehicle travels on the road RD in the direction (1)→(2)→(3) as shown by the vehicle position mark CM in FIG. 2, the cursor CSR moves on the wide area map A displayed on the main screen 1 accompanied by the vehicle position mark CM, as shown in FIG. 3(1)–(3). Also, the cursor screen 2 scrolls the detailed map in accordance with the movement of the cursor CSR.

When the movement of the center of the cursor CSR reaches a border line BLN (dotted line in FIG. 3(3)), which is located at a specific distance L (L≧0) from the periphery of the main screen 1, the main screen 1 displays a wide area map B in which the cursor CSR is located on the center thereof (FIG. 3(3)'). That is, the wide area map A is replaced by the wide area map B adjoining the wide area map A, and the cursor CSR is moved to be displayed on the center of the main screen 1.

Then, as the vehicle travels on the road RD in the direction (3)→(4) as shown by the vehicle position mark CM in FIG. 2, the cursor CSR moves on the wide area map B on the main screen 1 accompanied by the vehicle position mark CM, as shown in FIG. 3(3)'→(4). In addition, the cursor screen 2 scrolls the detailed map in accordance with the movement of the cursor CSR. Thereafter, the wide area map display/cursor movement display on the main screen 1 and the scrolling display of the detailed map on the cursor screen 2 are operated as mentioned above.

(a-2) Reduction/Expansion

Figure 4A:
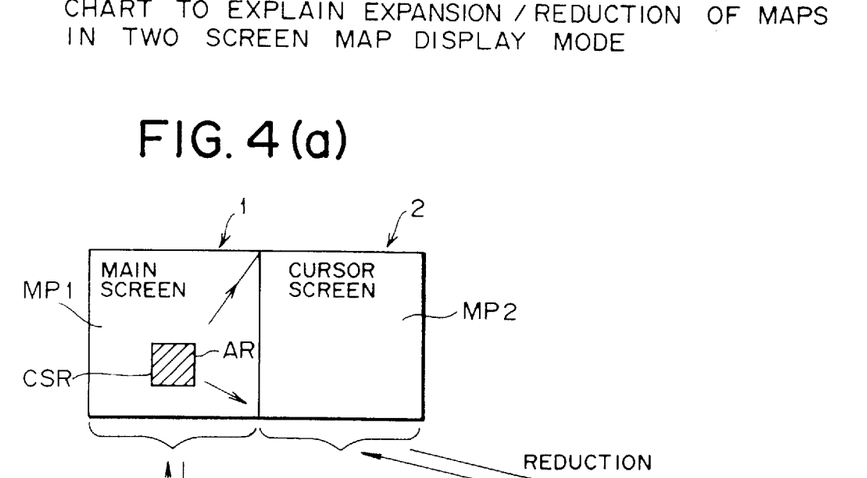
FIG. 4 is a chart to explain how to expand/reduce a map during the two-screen map display.
Figure 4B:
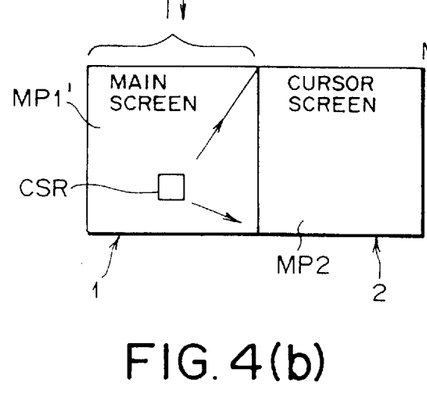

The initial scales of the wide area map MP1 and the detailed map MP2 are set in advance when the one-screen map display is shifted to the two-screen map display; however, the scales can be altered appropriately. In FIG. 4, suppose that the operator selects the main screen 1 as the operation screen, and instructs the system to reduce the wide area map MP1 in scale on the main screen 1. According to this instruction to reduce, the wide area map on the main screen 1 is reduced (the detailed map MP2 on the cursor screen 2 is not affected), and the size of the cursor CSR is reduced on the main screen 1 (FIG. 4(b)). Here, the size of the cursor CSR is determined by the scales of the maps on the main screen 1 and the cursor screen 2. Next, assuming that the operator instructs the system to expand the ide area map MP1' on the main screen 1 in FIG. 4(b), the wide area map on the main screen 1 is expanded, and the size of the cursor CSR is expanded (FIG. 4(a)).

On the other hand, beginning again in the state shown in FIG. 4(a), suppose that the operator selects the cursor screen 2 as the operation screen, and instructs the system to reduce the detailed map MP2 on the cursor screen 2. According to this instruction to reduce, the map on the cursor screen 2 is reduced (the wide area map MP1 on the main screen 1 is not affected), and the cursor CSR is expanded on the main screen 1 (FIG. 4(c)).

Figure 4C:
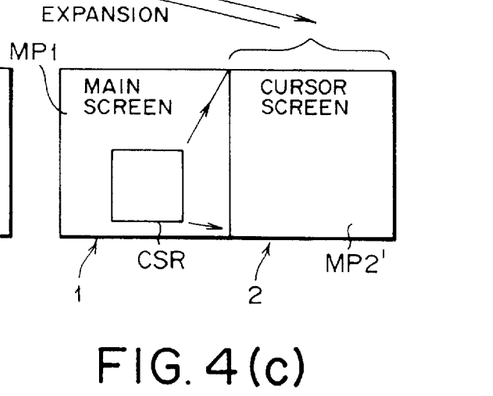

Next, assuming that the operator instructs the system to expand the detailed map MP2' on the cursor screen 2 in FIG. 4(c), the map on the cursor screen 2 is expanded, and the size of the cursor CSR is reduced (FIG. 4(a)).

(b) Construction of the Car Navigation Unit

Figure 5:
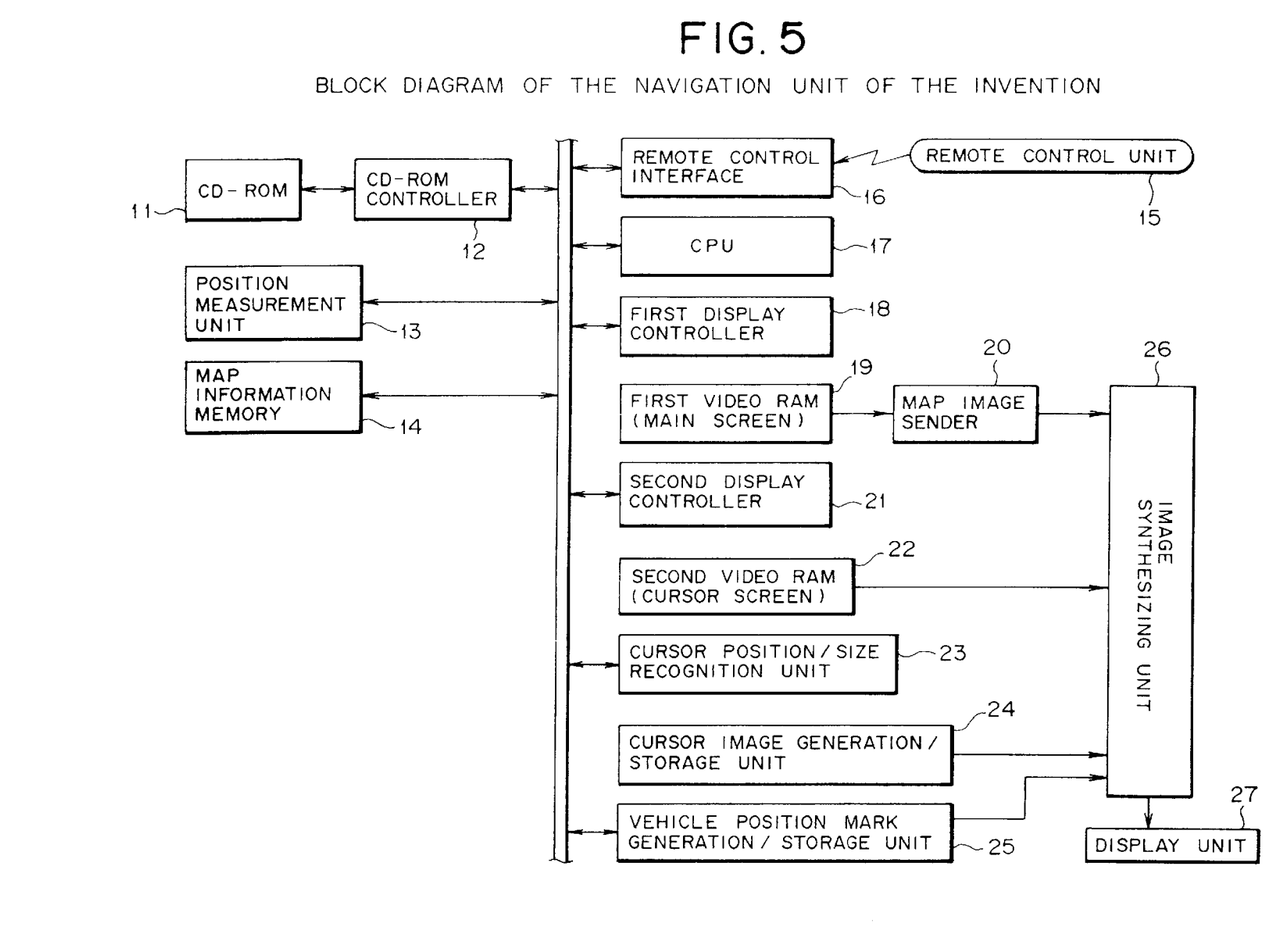
FIG. 5 is a block diagram of a car navigation unit according to the present invention.

FIG. 5 is a block diagram of the car navigation unit relating to the invention.

In the drawing, element 11 represents a storage medium to store maps, for example, a CD-ROM; element 12 a CD-ROM control unit to control the reading of the map information from the CD-ROM; element 13 a position measurement unit to measure the present position of a vehicle, which is comprised of a vehicle speed sensor to detect a migration length, a gyro to detect a traveling azimuth, a GPS, and a CPU for calculating the position, etc. Element 14 represents a map information memory to store map information read out from the CD-ROM; element 15 a remote control unit for selecting the operation such as a menu, one-screen/two-screen map display, expand/reduce, etc.; and element 16 a remote control interface unit.

Element 17 represents a processor (CPU) to control the entire car navigation unit; element 18 a first display controller that generates a map image in the one-screen map display mode and a wide area map image put on the main screen 1 in the two-screen map display mode; element 19 a first video RAM to store the map image generated by the first display controller 18; element 20 a map image sender to cut and pick out a map image by one screen from the first video RAM 19 and output; element 21 a second display controller that generates a detailed map image of the area AR indicated by the cursor CSR (FIG. 1); element 22 a second video RAM to store the detailed map image; element 23 a cursor position/size recognition unit to determine the position and size of the cursor CSR; element 24 a cursor image generation/storage unit to generate and store a cursor image; element 25 a vehicle position mark generation/storage unit to generate and store the driver's vehicle mark at the vehicle position; element 26 an image synthesizing unit to synthesize images and output; element 27 a display unit to display a map image outputted from the image synthesizing unit 26; and bus 28. Further, although not illustrated, a menu image generation unit, an intersection expanded image generation unit, and the like are included in addition to the above. The images generated by these units are supplied to the image synthesizing unit 26, and synthesized in a proper manner and outputted.

Figure 6:
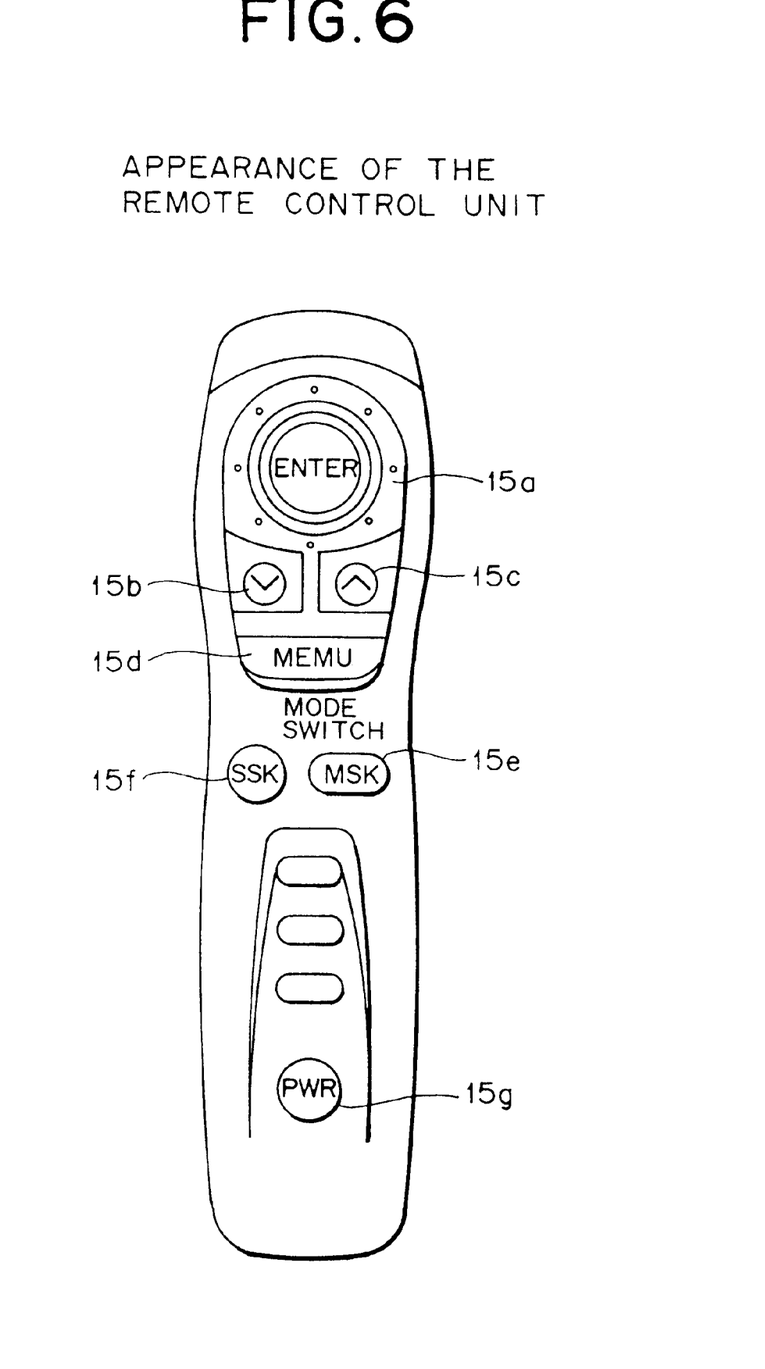
FIG. 6 illustrates the appearance of a remote control unit.

FIG. 6 illustrates the appearance of the remote control unit 15. Element 15a represents a joystick key for moving the cursor CSR in eight directions relative to the map, moving the menu selection bar right and left, or up and down to select a desired menu item, and pressing when inputting to set the cursor position, or when selecting a menu. Element 15b represents an expansion key operated to display a detailed map; element 15c a reduction key operated to display a wide area map; element 15d a menu key operated to display a menu; element 15e a display mode switch key (MSK) to switch between the one-screen map display mode and the two-screen map display mode; element 15f an operation screen selection key (SSK) to select a screen to be expanded/reduced while a wide area map is displayed on the main screen 1 and a detailed map is displayed on the cursor screen 2 in the two-screen map display mode; and element 15g a power supply key.

(c) Map Display Control

Figure 7:
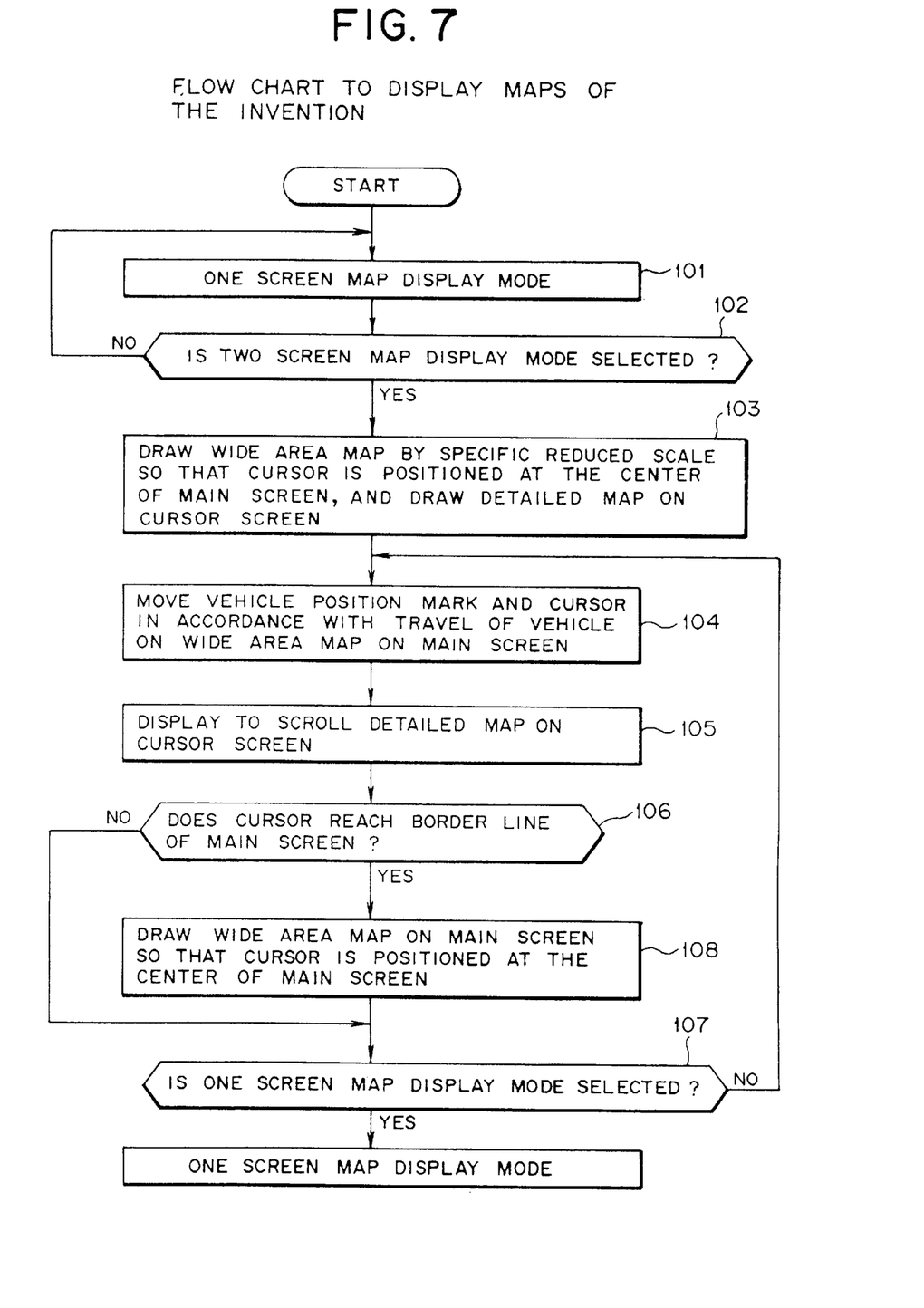
FIG. 7 is a flow chart to explain the map display process according to the invention.

FIG. 7 is a flow chart to illustrate the control processing of the map display.

Step 101 illustrates a state in which the map MP corresponding to the vehicle position is displayed in a specific scale on the display screen WSR (FIG. 1(a)). At step 102, the operator operates the display mode switch key 15e of the remote control unit 15 to select the two-screen map display mode or the one-screen map display mode.

If the operator selects the two-screen map display mode, the first display controller 18 generates nine screens of the wide area map image (FIG. 2) surrounding the vehicle position, and stores the map image data in the first video RAM 19. The map image sender 20 cuts and picks out the wide area map image A by one screen from the first video RAM 19 and supplies it to the image synthesizing unit 26, so that the vehicle is positioned at the center of the main screen 1, namely, the vehicle position mark CM and the cursor CSR are displayed at the center of the main screen 1.

In parallel with the foregoing, the cursor position/size recognition unit 23 obtains the reduced scales $1/S_1$, $1/S_2$ of the wide area map MP1 and the detailed map MP2 from the data of these maps stored in the memory in advance. By means of both the reduced scales, the lateral size X and longitudinal size Y of the cursor CSR are calculated by the following equations.

$$X = L_x \cdot (S_2/S_1)$$

$$Y = L_y \cdot (S_2/S_1)$$

(here, $L_x$, $L_y$ represent the sizes of the X, Y directions of the main screen).

Next, the sizes X, Y of the cursor CSR calculated by the above equations and the present vehicle position are each inputted to the cursor image generation/storage unit 24. The cursor image generation/storage unit 24 generates and stores the image of the cursor on the basis of the inputted information. The vehicle position mark generation/storage unit 25 generates and stores the vehicle mark.

The second display controller 21 generates the detailed map image of the area AR in correspondence with the position and size of the cursor CSR to store in the second video RAM 22.

Thereafter, the image synthesizing unit 26 synthesizes: (1) the wide area map read out by the map image sender 20, (2) the detailed map stored in the second video RAM 22, (3) the cursor image stored in the cursor image generation/storage unit 24, and (4) the vehicle mark stored in the vehicle position mark generation/storage unit 25, and generates a two-screen map to display on the display screen WSR (FIG. 1(*b*), step 103).

Next, as shown in FIGS. 3(1)–(3), in step 104 the vehicle position mark CM and the cursor CSR are moved in accordance with the travel of the vehicle on the wide area map A on the main screen 1. In step 105, the detailed map of the area corresponding to the size of the cursor CSR is displayed on the cursor screen 2, and the detailed map on the cursor screen 2 is scrolled in accordance with the travel of the vehicle.

In parallel with the foregoing display processes of the cursor movement and the scrolling of the detailed map, at step 106 the processor 17 checks if the vehicle position, namely, the center of the cursor CSR, reaches the border line BLN located at the specific distance L from the periphery of the main screen 1. If the vehicle position does not reach the border line BLN, the step 107 checks if the display mode is changed into the one-screen map display mode. If it is changed into the one-screen map display mode, the step 109 thereafter executes the display control according to the one-screen map display mode.

However, at step 107, if the mode is not changed into the one-screen map display mode and is still in the two-screen display mode, operation returns to step 104 to repeat the display processes of moving the cursor/vehicle mark, and scrolling the detailed map.

At step 106, if the vehicle position, namely, the center of the cursor CSR, reaches the border line BLN (FIG. 3(3)), the processor 17 informs the map image sender 20. Thereby, the map image sender 20 displays the wide area map B (FIG. 2) adjoining the wide area map A on the main screen 1, so that the cursor CSR is displayed on the center of the main screen 1 (FIG. 3(3)', step 108). Here, the wide area maps A, B adjoining each other overlap partially.

Thus, in replacement of the wide area map A, the wide area map B is displayed on the main screen 1, and the cursor CSR is displayed at the center of the main screen 1.

Thereafter, as the vehicle travels along (3)→(4) on the road RD, as shown by the vehicle position mark CM in FIG. 2, the cursor CSR moves on he wide area map B on the main screen 1 along with the vehicle position 89 mark CM, as shown by FIGS. 3(3)'→(4), and corresponding to the movement of the cursor CSR, the detailed map is scrolled on the cursor screen 2. Thereafter, the wide area map display/the cursor movement display on the main screen 1 and the scrolling display of the detailed map on the cursor screen 2 are carried out by the same control as described above.

In the foregoing embodiment, the cursor is moved to be displayed at the center of the main screen 1 at step 108; however, the cursor is not necessarily displayed at the center, but may be moved to be displayed at an arbitrary position around the center.

According to the invention thus described, the display system is arranged such that the display screen is divided into the main screen and the cursor screen, when the two-screen map display is requested. The wide area map is displayed on the main screen and at the same time the cursor indicating a specific area on the wide area map is displayed on the main screen; the detailed map of the area indicated by the cursor is displayed on the cursor screen; the cursor is moved in accordance with the travel of the vehicle on the wide area map on the main screen; and the detailed map is scrolled on the cursor screen in accordance with the movement of the cursor. Accordingly, it is possible to display the wide area map and the detailed map (expanded map) at the same time on the display screen, and in addition, it is possible to scroll the detailed map on the cursor screen synchronously with the cursor movement on the wide area map, which facilitates the driver's grasp of the vehicle's position on the map.

Further, according to the invention, when the cursor reaches a specific position (border line) on the main screen, the wide area map adjoining the wide area map having been displayed until that time is displayed on the main screen, and the cursor is moved to be displayed at a specific position (for example, the center) on the main screen. The wide area map is not thereafter changed until the cursor reaches the border line again; and since the wide area map is not displayed with a frequent switching of displays, the two-screen map display becomes easy to observe.

The invention has thus been described along with the foregoing embodiment, and the same may be varied in many ways without departing from the spirit and scope of the invention, and all such modifications as would be obvious to one skilled in the art are intended to be included within the scope of the following claims.

What is claimed is:

1. A method of displaying maps on a display screen for a vehicle navigation unit, the method comprising the steps of:

dividing the display screen into a main screen and a cursor screen;

displaying a wide area map on the main screen, and displaying a cursor indicating a specific area on said wide area map on the main screen; and displaying a detailed map of an area indicated by said cursor on the cursor screen;

wherein the size of the cursor is determined by reduced scales of maps on the main screen and on the cursor screen.

2. A method of displaying maps on a display screen for a vehicle navigation unit, the method comprising the steps of:

dividing the display screen into a main screen and a cursor screen;

displaying a wide area map on the main screen, and displaying on the main screen a cursor identifying and demarcating a specific area on said wide area map surrounding the position of the vehicle, when a two-screen map display is requested;

displaying on the cursor screen a detailed map at an expanded scale of the area identified and demarcated by said cursor;

the boundaries of the cursor screen corresponding to demarcation lines on the main screen and the cursor area is less than twenty-five percent of the main screen area;

moving the cursor on the wide area map on the main screen in accordance with the travel of the vehicle while the wide area map remains fixed, and scrolling the detailed map on the cursor screen in accordance with the movement of the cursor;

and, when the cursor reaches a specific position on the main screen, changing the wide area map displayed on the main screen to a display in which the cursor is moved to a setting position on the main screen.

3. A method of displaying maps for a vehicle navigation unit as claimed in claim 2, wherein the size of the cursor is determined by reduced scales of maps on the main screen and on the cursor screen.

4. A method of displaying maps for a vehicle navigation unit as claimed in claim 3, wherein a lateral size X and a longitudinal size Y of the cursor are obtained by the following equations:

$$X = L_x \cdot (S_2/S_1)$$

$$Y = L_y \cdot (S_2/S_1)$$

where $1/S_1$ represents the reduced scale of the wide area map, $1/S_2$ represents the reduced scale of the detailed map, and $L_x$, $L_y$ represent the sizes of the X, Y directions of the main screen.

5. A method of displaying maps for a vehicle navigation unit as claimed in claim 2, wherein the specific position is a position located at a specific distance inside from the periphery of the main screen.

6. A method of displaying maps for a vehicle navigation unit as claimed in claim 2, wherein the setting position is located virtually at the center of the main screen.

7. A method of displaying maps for a vehicle navigation unit as claimed in claim 2, wherein, when a reduction or expansion of the wide area map on the main screen is instructed, the displayed cursor is reduced or expanded without changing the detailed map on the cursor screen.

8. A method of displaying maps for a vehicle navigation unit as claimed in claim 7, wherein the size of the cursor is determined by reduced scales of maps on the main screen and on the cursor screen.

9. A method of displaying maps for a vehicle navigation unit as claimed in claim 2, wherein, when a reduction or expansion of the detailed map on the cursor screen is instructed, the displayed cursor is expanded or reduced without changing the wide area map on the main screen.

10. A method of displaying maps for a vehicle navigation unit as claimed in claim 9, wherein the size of the cursor is determined by reduced scales of maps on the main screen and on the cursor screen.

11. A method of displaying maps for a vehicle navigation unit as claimed in claim 2, wherein an external input device selects a one-screen or a two-screen map display.

12. A vehicle navigation unit that divides a display screen into a main screen and a cursor screen, and displays map data surrounding the vehicle that is read out from a map data storage medium, the vehicle navigation unit comprising:

a first display means to display a wide area map on the main screen, and to display on the main screen a cursor identifying and demarcating a specific area on said wide area map surrounding the position of the vehicle, when a two-screen map display is requested; and a second display means to display on the cursor screen a detailed map image at an expanded scale of the area identified and demarcated by the cursor, the boundaries of the cursor screen corresponding to demarcation lines on the main screen, and the cursor area is less than twenty-five percent of the main screen area, wherein the vehicle navigation unit moves the cursor on the wide area map on the main screen in accordance with the travel of the vehicle while the wide area map remains fixed, and scrolls the detailed map on the cursor screen in accordance with the movement of said cursor.

13. A vehicle navigation unit as claimed in claim 12, further comprising an external input device to select a one-screen or a two-screen map display, wherein, when the two-screen map display is requested, the vehicle navigation unit divides the display screen into the main screen and the cursor screen.

14. A vehicle navigation unit as claimed in claim 12, further comprising an external input device to select a reduction or expansion of maps, wherein, when the reduction or expansion of the wide area map on the main screen is instructed, the vehicle navigation unit reduces or expands the size of the cursor without changing the detailed map on the cursor screen.

15. A vehicle navigation unit as claimed in claim 12, further comprising an external input device to select a reduction or expansion of maps, wherein, when the reduction or expansion of the detailed map on the cursor screen is instructed, the vehicle navigation unit expands or reduces the size of the cursor without changing the wide area map on the main screen.

16. A vehicle navigation unit as claimed in claim 12, further comprising a cursor position/size recognition unit to determine the position and size of the cursor, wherein, when the cursor reaches a specific position on the main screen, the vehicle navigation unit changes the wide area map displayed on the main screen to a display in which the cursor is moved to a setting position on the main screen.

17. A vehicle navigation unit as claimed in claim 16, wherein the specific position is a position located at a specific distance inside from the periphery of the main screen.

18. A vehicle navigation unit as claimed in claim 16, wherein the cursor position/size recognition unit determines the size of the cursor by a reduced scale of the wide area map on the main screen and a reduced scale of the detailed map on the cursor screen.

19. A vehicle navigation unit as claimed in claim 18, wherein the cursor position/size recognition unit obtains a lateral size X and a longitudinal size Y of the cursor by the following equations:

$$X = L_x \cdot (S_2/S_1)$$

$$Y = L_y \cdot (S_2/S_1)$$

where, $1/S_1$ represents the reduced scale of the wide area map, $1/S_2$ represents the reduced scale of the detailed map, and $L_x$, $L_y$ represent the sizes of the X, Y directions of the main screen.

* * * * *